(12) United States Patent
Bellet et al.

(10) Patent No.: US 10,001,064 B2
(45) Date of Patent: Jun. 19, 2018

(54) ASSEMBLY OF AN INNER FIXED STRUCTURE OF A TURBOJET ENGINE NACELLE AND OF A THERMAL PROTECTION

(71) Applicant: SAFRAN NACELLES, Gonfreville l'Orcher (FR)

(72) Inventors: François Bellet, Gonfreville l'Orcher (FR); Cédric Renault, Gonfreville l'Orcher (FR)

(73) Assignee: SAFRAN NACELLES, Gonfreville L'orcher (FR)

( * ) Notice: Subject to any disclaimer, the term of this patent is extended or adjusted under 35 U.S.C. 154(b) by 0 days. days.

(21) Appl. No.: 15/495,413

(22) Filed: Apr. 24, 2017

(65) Prior Publication Data

US 2017/0226931 A1    Aug. 10, 2017

Related U.S. Application Data

(63) Continuation of application No. PCT/FR2015/052853, filed on Oct. 23, 2015.

(30) Foreign Application Priority Data

Oct. 24, 2014    (FR) .................... 14 60261

(51) Int. Cl.
*F02C 7/24*    (2006.01)
*F02K 1/82*    (2006.01)

(52) U.S. Cl.
CPC ............... *F02C 7/24* (2013.01); *F02K 1/822* (2013.01); *F05D 2220/323* (2013.01); *F05D 2260/231* (2013.01)

(58) Field of Classification Search
CPC ... F02C 7/24; F02K 1/822; F02K 1/82; F02K 1/80; F05D 2220/323; F05D 2260/231; F05D 2260/31; F01D 25/08; F01D 25/14; F01D 25/145; F01D 25/24
USPC .......................................................... 415/177
See application file for complete search history.

(56) References Cited

U.S. PATENT DOCUMENTS

| | | | |
|---|---|---|---|
| 4,820,097 A * | 4/1989 | Maeda .................... | F02K 1/80 165/134.1 |
| 9,127,452 B1 * | 9/2015 | Winfield ................ | B32B 5/022 |
| 2008/0112796 A1 | 5/2008 | Coney et al. | |
| 2014/0133964 A1 | 5/2014 | Ayle | |

FOREIGN PATENT DOCUMENTS

| | | |
|---|---|---|
| EP | 1296090 | 3/2003 |
| EP | 2738470 | 6/2014 |
| FR | 2829811 | 3/2003 |

OTHER PUBLICATIONS

International Search Report for International Application PCT/FR2015/052853, dated Jan. 28, 2016.

* cited by examiner

*Primary Examiner* — Dwayne J White
*Assistant Examiner* — Justin A Pruitt
(74) *Attorney, Agent, or Firm* — Burris Law, PLLC

(57) ABSTRACT

The present disclosure relates to an assembly of an inner fixed structure of a turbojet engine nacelle and of a thermal protection, said structure including an inner face, on which the thermal protection is added, and an outer face constituting a portion of the inner surface of a cold flow path, the assembly including at least one channel put in fluid communication the inner face and the outer face of the structure.

5 Claims, 3 Drawing Sheets

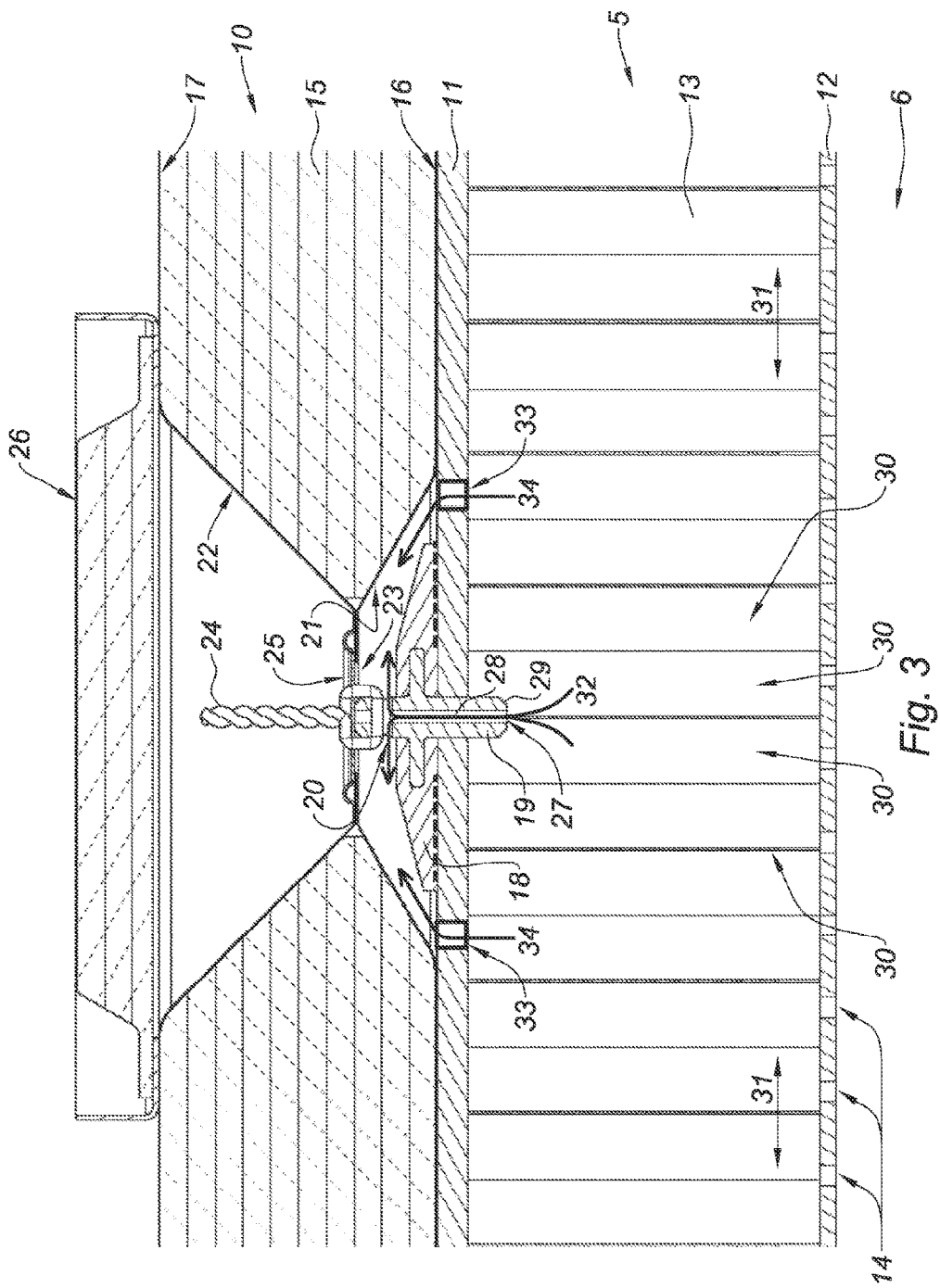

ASSEMBLY OF AN INNER FIXED STRUCTURE OF A TURBOJET ENGINE NACELLE AND OF A THERMAL PROTECTION

CROSS-REFERENCE TO RELATED APPLICATIONS

This application is a continuation of International Application No. PCT/FR2015/052853, filed on Oct. 23, 2015, which claims priority to and the benefit of FR 14/60261 filed on Oct. 24, 2014. The disclosures of the above applications are incorporated herein by reference.

FIELD

The present disclosure relates to the arrangement of thermal protections on an inner fixed structure of a turbojet engine nacelle.

BACKGROUND

The statements in this section merely provide background information related to the present disclosure and may not constitute prior art.

An aircraft is driven by one or more turbojet engine(s) each housed in a nacelle. A nacelle generally has a substantially tubular structure comprising an air inlet upstream of the turbojet engine, an intermediate assembly intended to surround a fan of the turbojet engine and a rear assembly which can integrate thrust reversal means and intended to surround the combustion chamber and all or part of the compressor and turbine stages of the turbojet engine, and is generally ended by an ejection nozzle the outlet of which is located downstream of the turbojet engine.

The modern nacelles are intended to accommodate a bypass turbojet engine capable of generating, on the one hand, a flow of hot gases (also called main flow) coming from the combustion chamber of the turbojet engine and circulating in a space delimited by a compartment of substantially tubular shape called a "core" compartment, and on the other hand, a cold air flow (called secondary flow) coming from the fan and circulating outside of the turbojet engine through an annular passage, also called flow path, formed between an inner structure defining a fairing of the turbojet engine and an inner wall of the nacelle. The two flows are ejected from the turbojet engine by the back of the nacelle.

The "core" compartment comprises an outer envelope serving as a casing and called inner fixed structure (IFS).

This IFS is subjected to high thermal stresses and it is usually protected by using thermal protection panels, thereby insulating the components of the nacelle from the engine environment in order to maintain them at acceptable temperatures and thus extending their service life.

These thermal protections also provide fire protection and can be used in other areas of the nacelle, at which there is a risk of fire.

In order to thermally protect the IFS, it is known to resort to protection panels disposed for example on the "core" compartment side and comprising at least one insulating mat, generally made from silica fibers, ceramics or a microporous material, said mat being sandwiched between sheets generally made of stainless steel.

The thermal protection mats are fastened to the IFS using fastening systems which cooperate locally with the IFS over the entire protection surface, in the manner of rivets. The thermal protection is also retained to the IFS at the edges by retaining strips commonly called "retainers."

An example of a known fastening system is described in the document FR 2 829 811.

Such a fastening system uses a safety wire system and generally comprises two parts, namely a base fastened in the IFS having a hooking structure (for example a hook, loop or eyelet bolt type) and a retaining button. The hooking structure is disposed in a corresponding fastening opening of the mat, and is capable of receiving a link called a safety wire. The retaining button bears against an outer surface of the mat so as to form a maintaining and clamping washer, the retaining button being provided with passage orifices of the safety wire whose ends are twisted and clamped.

The retaining of the panel on the IFS is thus provided.

In order to improve the fastening, the twisted end of the safety wire is then sealed in silicone.

Alternatively, the safety wire system may be replaced by a threaded or tapped hooking structure cooperating with a complementary end of the retaining button.

In general, the known fastening systems do not provide a sufficient cooling at the attachment points. This is due in particular to the fact that the hooking structures constitute thermal bridges, all the more so since the hooking structures are generally manufactured in a metallic material. In order to overcome this problem, it is generally envisaged to increase the insulation, either by increasing the thickness of the mat or by making said mat of a material contributing to more reliable insulation. However, these solutions are not satisfactory in terms of performance and cost. Furthermore, increasing the thickness of the mat is not always possible.

SUMMARY

The present disclosure includes an assembly of an inner fixed structure of a turbojet engine nacelle and of a thermal protection member, said structure including an inner face, on which the thermal protection member is added, and an outer face constituting a portion of the inner surface of a cold flow path, the assembly being characterized in that at least one channel puts in fluid communication the inner face and the outer face of the structure.

Thus, by allowing creating a fresh air supply coming from the cold air flow path of the nacelle, the air passages in accordance with the present disclosure provide the desired cooling for the areas surrounding the attachment points of the thermal protection member. Thus, the need to increase the thickness or the quality of the insulating material constituting the thermal protection member is avoided.

According to other optional characteristics of the assembly according to the present disclosure:

the inner structure includes an inner skin and an outer skin provided with acoustic perforations, the inner skin and the outer skin surrounding an alveolar core;

the thermal protection member is added on the inner skin of the inner fixed structure, said channel including at least one through-hole formed in the inner skin;

the thermal protection member is fastened to the inner fixed structure by at least one fastening device comprising a fastening base secured to the inner fixed structure, said fastening base including an inner conduit passing through the inner skin and forming said channel;

the fastening base includes a hooking structure of a retaining link of the thermal protection member, the hooking structure including a through-hole forming the inner conduit;

the through-hole opens into a second through-hole forming a loop for the retaining link.

The present disclosure also relates to a nacelle of a turbojet engine of an aircraft, including an assembly of an inner fixed structure and a thermal protection member as defined hereinabove.

Further, the present disclosure relates to an aircraft propulsion unit including a turbojet engine housed in a nacelle as defined hereinabove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a cross-sectional view of a second form of an assembly of the present disclosure.

Figure 1:
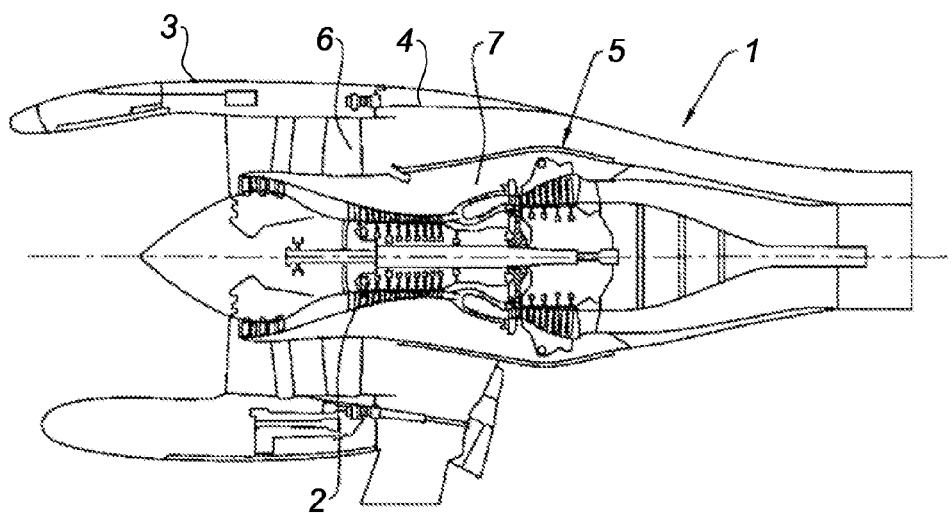
FIG. 1 is a longitudinal sectional view of an aircraft propulsion unit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a longitudinal sectional view of an aircraft propulsion unit 1, including a turbojet engine 2 housed in a nacelle 3. The nacelle 3 includes an outer fixed structure (OFS) 4 and an inner fixed structure (IFS) 5. These two structures are concentric and define a flow path 6 in which the cold air circulates when the turbojet engine 2 is in operation. The IFS 5 constitutes the outer envelope of the "core" compartment 7 of the turbojet engine 2.

Figure 2:
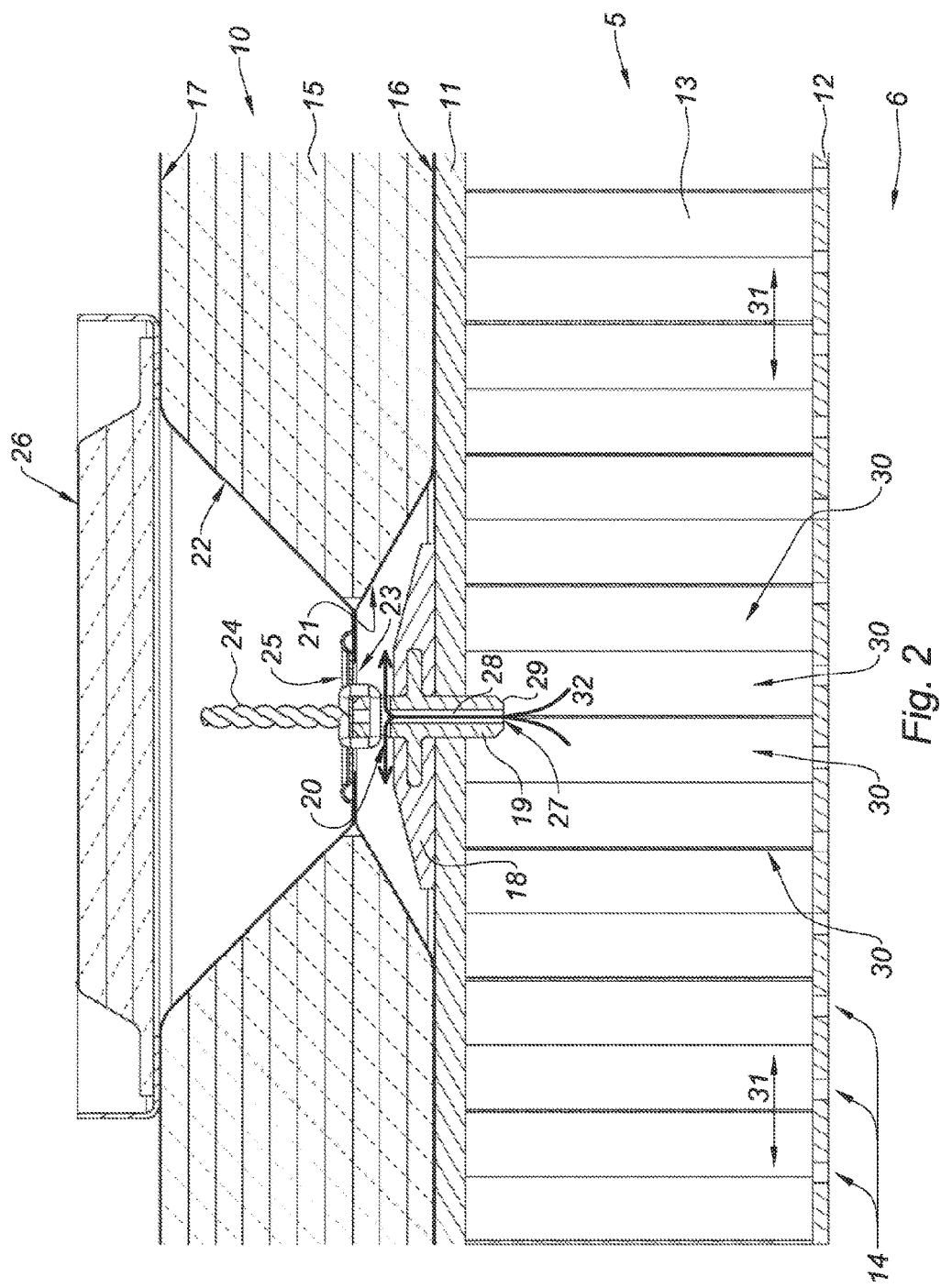
FIG. 2 is cross-sectional view of one form of an assembly of the present disclosure.

FIGS. 2 and 3 show longitudinal cross-sectional views of a portion of an IFS 5 of a turbojet engine nacelle, on which a thermal protection member 10 is fastened. The IFS 5 is composed of one or more sandwich panel(s), including an inner skin 11, called a support skin, and an outer skin 12. In this form, the inner skin 11 and the outer skin 12 surround an alveolar core 13, for example a metal structure of the honeycomb type. The outer skin 12 constitutes a portion of the inner surface of the flow path 6. The outer skin 12 may further comprise a plurality of perforations 14 called acoustic perforations.

The thermal protection member 10 includes a thermal protection mat 15. The mat 15 includes a face in contact with the IFS 5, called inner face 16, and an opposite face, called outer face 17. In this form, the inner 16 and outer 17 faces of the mat 15 are covered by metal sheets.

The mat 15 is fastened to the IFS 5 by means of a plurality of fastening systems. Each system comprises a fastening base 18. The fastening base 18 is fastened to the inner skin of the IFS 5, for example by gluing, and is equipped with a hooking structure 19. In this form, the hooking structure 19 is in the form of an eyelet bolt 20 projecting along a direction substantially normal to the surface of the inner skin 11 on which the base 18 is added.

The thermal protection mat 15 covers the base 18 and includes, to this end, an opening 21 formed in the thickness of the mat 15. In this form, the opening 21 is constituted by a truncated cone-shaped recess whose largest section is the section located at the inner face 16 of the mat 15.

On the side of the mat 15 opposite to the opening 21, a recess 22 formed in the thickness of the mat and opening onto the outer face 17 of the mat 15 is disposed. The recess 22 communicates with the opening 21 so as to form a passage through the mat 15, in order to allow, as it will be seen hereinafter, a safety wire 24 to pass through the mat 15. The recess 22 allows an operator increased accessibility to the hooking structure 19. To this end, the recess 22 in the form illustrated in FIG. 2 has a flared shape, the largest section of the recess 22 being thus located at the outer face 17 of the mat 15. As shown in FIG. 2, the flared shape of the recess 22 may be a truncated cone shape.

The opening 21 and the recess 22 communicate through an orifice 23 facing the hooking structure 19. Advantageously, the section of the orifice 23 is reduced, so that the annular portion of the mat 15 surrounding the orifice 23 and hence separating the opening 21 and the recess 22, is larger. Therefore, the reliability of the thermal insulation at this location is improved.

The hooking structure 19 is operable to cooperate with a link forming a retaining means, for example, a safety wire 24. The safety wire 24 is associated with a retaining button 25. Thus, during the setting-up of the mat 15, the safety wire 24 is introduced through the eyelet 20 of the hooking structure 19. Once the safety wire 24 is correctly positioned in the eyelet 20, the ends of the safety wire 24 are introduced through two corresponding orifices (not visible) of the retaining button 25. The safety wire 24 is then twisted so as to provide the clamping and the bearing of the retaining button 25. The fastening of the safety wire 24 is provided for by immersing the ends of the safety wire 24, for example in silicone. The recess 22 is then covered by an insulating cap 26.

In accordance with the present disclosure, one or more air passage(s) are provided between the front face of the IFS 5, constituted in the example by the outer skin 12, and the rear face of the IFS 5, constituted in the example by the inner skin 11. Such air passages are provided in close proximity of each of the fastening systems shown in FIGS. 2 and 3.

In the example of FIG. 2, the present disclosure is implemented thanks to a through-hole 27 provided in the hooking structure 19 and forming a conduit 28. The conduit 28 opens at a lower end 29 of the hooking structure 19. The hooking structure 19 passes through the inner skin 11 of the IFS 5, so that the lower end 29 of the hooking structure 19 is located within the alveolar core 13, between the inner skin 11 and the outer skin 12. Thus, the conduit 28 opens directly within the alveolar core 13 and is in fluid communication with the flow path 6, through the acoustic perforations 14 of the outer skin 12 of the IFS 5.

At its other end, the conduit 28 opens into the space delimited by the inner skin 11 and the recess 21, for example, through a transverse through-piercing located close to an upper end of the hooking structure 19. Advantageously, as shown in FIGS. 2 and 3, this transverse piercing is coincident with the eyelet 20.

Due to the configuration of the hooking structure 19 described hereinabove, and more particularly to the inner conduit 28 that it includes, the fresh air coming from the flow path 6 and penetrating into the alveolar core 13 via the acoustic perforations 14 (see arrows 30) can pass through the inner skin 11 of the IFS 5 (see arrow 32). Thus, according to the present disclosure, fresh air coming from the flow path 6 is brought in the close proximity of each attachment point of the mat 15, in the space around the fastening base 18. It should be noted that the fresh air also circulates between the various cells of the alveolar core 13, through drain holes existing between the cells (see arrows 31). This fresh air supply allows proper cooling of the environment of each of the attachment points of the thermal protection mat 15.

Alternatively or as a complement, one or more air passage(s) may be provided not within the fastening base 18 but directly in the inner skin 11 of the IFS. Such air passages are shown in an alternate form of the present disclosure in FIG. 3. In this form, two holes 33 passing through the inner skin 11, disposed on either side of the fastening base 18 are provided. Like for the conduit 28 of FIG. 2, the holes 33 open onto one side into the alveolar core 13, and, on the opposite side, into the space delimited by the inner skin 11 and the recess 21. Just like the inner conduit 28 of the hooking structure, the holes 33 made in the inner skin 11 of the IFS 5 constitute a fresh air supply coming from the flow path 6 (see arrows 34).

It will be noted that the various forms of the present disclosure described hereinabove are implemented in a combined manner and illustrated in FIG. 3, but these forms may be implemented separately. Thus, the second form, consisting of air passages made directly in the inner skin 11, may improve a posteriori the cooling of an inner fixed structure in accordance with the prior art: indeed, it will be sufficient to proceed with the piercing of the inner skin of this structure, without the need for modifying the attachment system of the existing thermal protection member.

Although the present disclosure has been described with various forms, it is not limited thereto and that it comprises all the technical equivalents of the means described as well as the combinations thereof if said combinations are within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly of an inner fixed structure of a turbojet engine nacelle and of a thermal protection member, said inner fixed structure including:
    an inner face, on which the thermal protection member is secured;
    an outer face, constituting a portion of an inner surface of a cold flow path;
    an inner skin and an outer skin provided with acoustic perforations, the inner skin and the outer skin surrounding an alveolar core,
    wherein the assembly includes:
    at least one channel in fluid communication between the inner face and the outer face of the inner fixed structure, and
    wherein the thermal protection device is fastened to the inner face of the inner fixed structure by at least one fastening device comprising a fastening base secured to the inner fixed structure, said fastening base including an inner conduit passing through the inner skin and forming said channel, wherein the fastening base includes a hooking structure of a retaining link of the thermal protection member, the hooking structure passing through the inner skin such that a lower end thereof is located within the alveolar core, and the hooking structure including a through-hole forming the inner conduit.

2. The assembly according to claim 1, wherein said channel includes at least one through-hole formed in the inner skin of the inner fixed structure.

3. The assembly according to claim 1, wherein the through-hole opens into a second through-hole, forming a loop for the retaining link.

4. A nacelle of an aircraft turbojet engine, including an assembly of an inner fixed structure and a thermal protection member in accordance with claim 1.

5. An aircraft propulsion unit including a turbojet engine housed in a nacelle in accordance with claim 4.

* * * * *